United States Patent [19]

Suchoski, Jr. et al.

[11] Patent Number: 5,223,911
[45] Date of Patent: Jun. 29, 1993

[54] SINGLE-POLARIZATION, INTEGRATED OPTICAL COMPONENTS FOR OPTICAL GYROSCOPES

[75] Inventors: Paul G. Suchoski, Jr., East Hartford; Talal K. Findakly, Glastonbury; Carl M. Ferrar, East Hartford; Frederick J. Leonberger, Glastonbury, all of Conn.

[73] Assignee: United Technologies Corporation, Hartford, Conn.

[21] Appl. No.: 967,928

[22] Filed: Oct. 28, 1992

Related U.S. Application Data

[63] Continuation of Ser. No. 329,121, Mar. 27, 1989, abandoned.

[51] Int. Cl.$^5$ ............................................. G01C 19/72
[52] U.S. Cl. ........................................ 356/350; 385/14
[58] Field of Search .................. 356/350; 350/96.11, 350/96.12; 385/14

[56] References Cited

U.S. PATENT DOCUMENTS

| | | | |
|---|---|---|---|
| 4,070,094 | 1/1978 | Martin | 350/96 |
| 4,196,964 | 4/1980 | Papuchon | 350/96.14 |
| 4,468,085 | 8/1984 | Papuchon et al. | 350/96.14 |
| 4,695,121 | 9/1987 | Mahapatra et al. | 350/96.12 |
| 4,707,059 | 11/1987 | Ogura et al. | 350/96.12 |
| 4,848,910 | 7/1989 | Dupraz | 356/350 |
| 4,871,226 | 10/1989 | Courtney | 350/96.11 |

OTHER PUBLICATIONS

"Low-Insgation-Loss Channel Waveguides in LiNbO$_3$ Fabricated by Proton Exchange", Veselka et al., Electronics Letters p. 265, 1987.
P. G. Suchoski, T. K. Findakly, and F. J. Leonberger, *Depolarization in Ti: LiNbO$_3$ waveguides and its effect on circuit design*, Electron. Lett. 23, pp. 1357–1358 (1988).
R. A. Berge, H. C. Lefevre, and H. J. Shaw, *Single-Mode fiber-optic polarizer*, Opt. Lett. 5, pp. 479–481 (1980).
W. Eickhoff, *In-line fiber-optic polarizer*, Electron. Lett. 16, pp. 762–763 (1980).
Y Takuma, H. Kajioka, and K. Yamada, *High performance polarizer and sensing coils with elliptical jacket type Single polarization fibers*, Opt. Fiber Sensor Conf., New Orleans, La., Jan. 27–29, 1988 paper FEE 3.
T. Findakly and C. L. Chen, *Diffused optical waveguides with exponential profile: effects of metal-clad and dielectric overlay*, Appl. Opt. 17, pp. 469–474 (1978).
T. Findakly, B. Chen, and D. Booher, *Single-mode integrated-optical polarizers in LiNbO$_3$ and glass waveguides*, Opt. Lett. 8, pp. 641–643 (1983).
J. Ctyroky and H. J. Henning, *Thin-film polarizer for Ti: LiNbO$_3$ waveguides at 1.3 micron*, Elecron. Lett. 22, pp. 756–758 (1986).
J. Jackel, C. Rice, and J. Veselka, *Proton exchange for high index waveguides in LiNbO$_3$*, Appl. Phys. Lett. 41, pp. 607–608 (1982).
M. M. Abou el leil and F. J. Leonberger, *Waveguides in LiNbO$_3$ by diluted proton ion-exchange*, Am. Ceramic Soc. Ann. Mtg., Pittsburgh, Apr. 26–30, 1987, paper 53-EP-87.
P. G. Suchoski, M. M. About el leil, T. K. Findakly, and F. J. Leonberger, *Low-loss proton-exchange LiNbO$_3$ waveguides with no electrooptic degradation*, Integrated and Guided Wave (IGWO) Conf., Santa Fe, NM, Mar. 28–30, 1988, paper MD 4.
P. G. Suchoski, T. K. Findakly, and F. J. Leonberger, *Low-loss high-extinction polarizers fabricated in LiNbO$_3$ by proton exchange*, Opt. Lett. 13, pp. 172–174 (1988).

*Primary Examiner*—Samuel A. Turner
*Attorney, Agent, or Firm*—Richard H. Kosakowski

[57] ABSTRACT

A FOG system with a high polarization extinction ratio includes an integrated optic circuit (IOC) having a waveguide array fabricated by a proton exchange (PE) process, the IOC being operatively connected for providing single mode, single polarization filtering of incident light guided from the FOG light source to the sensing loop and of the interference signal guided from the sensing loop to the detector.

22 Claims, 1 Drawing Sheet

SINGLE-POLARIZATION, INTEGRATED OPTICAL COMPONENTS FOR OPTICAL GYROSCOPES

CROSS REFERENCE TO RELATED APPLICATIONS

Some of the subject matter disclosed and claimed herein is also disclosed and claimed in one or more of the following commonly owned, copending U.S. patent applications filed on event date herewith by Suchoski et al., Ser. No. 329,123, entitled *Low-Loss Proton Exchanged Waveguides For Active Integrated Optic Devices*; and Suchoski et al., Ser. No. 328,940, entitled *Integrated Optic Star Coupler*.

This is a continuation of application Ser. No. 07/329,121 filed Mar. 27, 1989 and now abandoned.

TECHNICAL FIELD

This invention relates to integrated optics circuits (IOCs), and more particularly to IOC's for use in optical gyroscopes.

BACKGROUND ART

As known, the operating principle of the fiber optic gyroscope (FOG) is the Sagnac effect. When light transverses an optic fiber loop which is rotating about an axis perpendicular to its plane, the optical transit time of the light signal varies in dependence on the loop's rotation rate. For two optical signals transversing the loop in opposite directions the Sagnac phase difference between them (S; in radians) is proportional to the rotation rate, and is given by:

$$S = \frac{2 * \pi * L * d}{\lambda * c} * \Omega \quad \text{(Equation 1)}$$

where: L is the length of the fiber loop, d is the loop diameter, $\lambda$ is the optical signal wavelength, c is the speed of light, and $\Omega$ is the loop rotation rate in radians/sec.

This difference, which serves as a measure of the rate, may be increased by using a fiber optic coil to increase the loop length (L). To alleviate the necessity of having to measure a DC value, a sinusoidal phase modulator may be used at one end of the loop to modulate the beams. The modulation acts on the counter circulating beams at different times due to the optical transit time delay in the coil, which results in a dithering of the phase difference. This improves the detection sensitivity by allowing the use of sensitive AC processing.

If opposing beams of unit intensity are added interferometrically the total intensity is:

$$I = \tfrac{1}{2} * (1 + \cos P) \quad \text{(Equation 2)}$$

where P is total phase difference. Bessel expansion of the intensity expression produces a component:

$$F = k * \sin(S) \quad \text{(Equation 3)}$$

at the modulation frequency f. This can be taken as an analog output of the phase dithered Sagnac interferometer. The coefficient k is:

$$k = 2 * J_1 * [2A * \sin(\pi * f * T)] \quad \text{(Equation 4)}$$

where the term $2A * \sin(\pi * f * T)$ is the dither amplitude resulting from an applied modulation frequency (f) modulation of amplitude (A), with a coil transit time T. The amplitude is maximized when $f = \tfrac{1}{2}T$ (the coil eigenfrequency).

The analog output F, of frequency f, is proportional to rotation at sufficiently small rates. It can be measured directly as an indication of rotation, or the output can be continuously nulled by a servo loop which adds an optical phase bias in opposition to the Sagnac phase difference. This can be achieved by adding a repetitive linearly ramped phase modulator (serrodyne modulation) at one end of the fiber coil. If the peak ramp amplitude is $2\pi$ radians, the serrodyne modulation produces an effectively constant phase difference bias between the oppositely directed beams. The phase bias amplitude is proportional to the ramp repetition frequency, which constitutes an easily measurable representation of the loop rotation rate.

FOG operation assumes the counter circulating beams travel identical paths in the absence of rotation and of applied phase bias, i.e. "reciprocity". However, different spatial modes and orthogonal polarization modes of the fiber coil are not always degenerate. Power coupled between modes can perturb the optical phase at the detector, causing drift in the FOG. Further, it may be difficult to simultaneously optimize phase modulation of the beam's desired and undesired polarization components, and gyro output error may result.

To eliminate cross coupling between spatial modes and to control polarization, prior art Sagnac gyros include both a single-spatial-mode filter and a single-polarizer filter in the beam propagation path. The filters are located in the optical path which is common to the source beam and the interfering beams; between the optical detector and the loop beam splitter. This "reciprocal configuration" confines the optical signals to a single spatial mode, and a single polarization. The polarizing filter may be a bulk optic polarizer, such as a Glan-Thompson prism which provides extinction ratios of 60 dB, or any other of a variety of fiber or integrated optic (IO) polarizers. The single mode filter may comprise a short length of single-mode fiber or waveguide.

However, unless the polarizing filter extinction ratio is sufficiently high, light polarized at the filter, which may become appreciably depolarized after traversing the loop, may arrive at the detector with significant power in the undesired polarization. In some cases the filter extinction ratio must be as high as 100 to 140 dB to reduce this power to acceptable levels.

DISCLOSURE OF INVENTION

The object of the present invention is to provide a fiber optic gyro (FOG) system having a high polarization extinction ratio.

According to the present invention, a FOG system includes a source for producing an incident light beam, a fiber optic sensing loop for producing a Sagnac interference signal from two counter circulating beams, an optical detector for detecting intensity of the interference signal, and one or more directional couplers for coupling the incident light to the loop and for coupling the interference signal from the loop to the detector, as characterized by a highly polarized integrated optic circuit (IOC) fabricated by proton exchange on a LiNbO$_3$ substrate. In further accord with the present invention, the substrate material may be LiTaO$_3$. In still further accord with the present invention, the substrate material has an X-cut orientation.

In still further accord with the present invention the IOC includes a beam splitter for dividing the incident light beam into two counter circulating beams for presentation to the sensing loop, and integrated optic (IO) elements for phase modulating the counter circulating beams. In still further accord with the invention, the beam splitter comprises a symmetrical Y-junction. In still further accord with the present invention, the beam splitter comprises a directional coupler.

The FOG system of the present invention uses proton exchanged (PE) waveguide structures in either LiNbO$_3$ or LiTaO$_3$ to produce an IOC having a high degree of polarization control. The IOC includes a beam splitter, such as a symmetrical Y-junction or a directional coupler, phase modulators, and single mode input/output waveguides. The waveguides provide polarization extinction ratios greater than 55 dB.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 2:
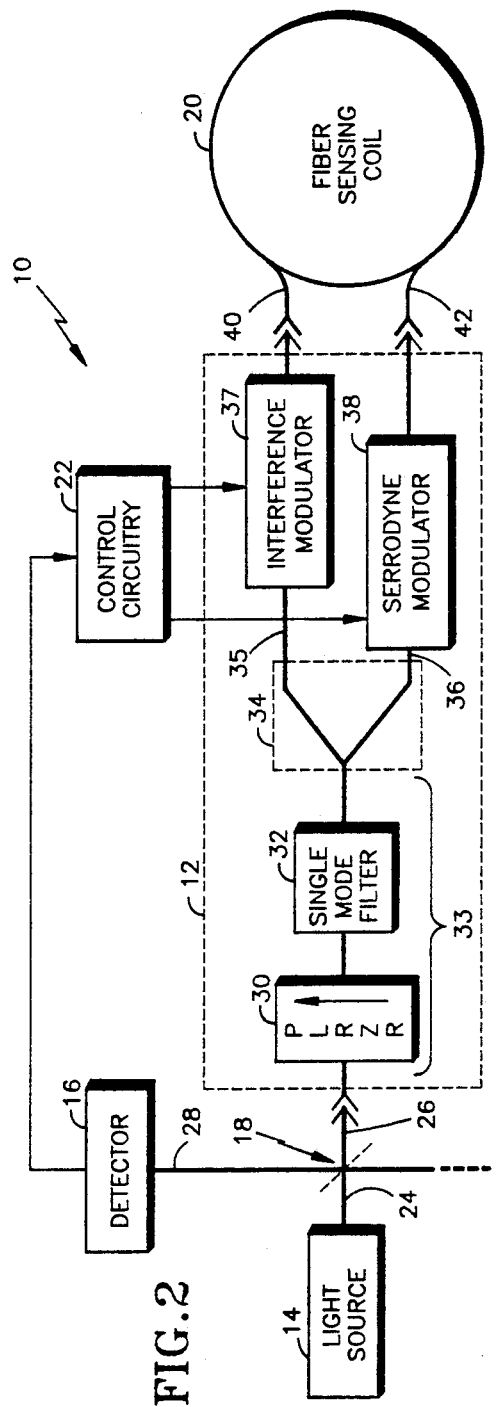
FIG. 2 is a schematic illustration of a FOG system in which the IOC embodiment of FIG. 1 may be used.

Referring first to FIG. 2, in the best mode embodiment of a FOG system 10 according to the present invention, the FOG system includes an IOC 12 which integrates several critical FOG optical functions on a single, small substrate chip. As described in detail hereinafter, inclusion of the IOC optical elements shown in FIG. 2 provides a "reciprocal configuration" FOG system. This ensures that only "non-reciprocal" effects, such as rotation and time varying propagation parameters, affect the differential phase between the counter circulating optical beams.

In addition to the IOC 12, the system 10 includes a light source 14, light detection circuitry 16, an output tap 18 (which may be a directional coupler or a beam splitter), a fiber optic sensing coil 20, and control circuitry 22. In the case of high performance FOG applications the light source may comprise a superluminescent (semi-conductor) diode (SLD). The SLD provides a spectrally broad, short coherence length (less than 100 microns) optical beam. Lower performance FOG applications may use a less expensive laser diode. The source provides the coherent optical beam on output fiber 24 to the tap 18.

The tap transmits a major portion of the incident source beam, approximately 50%, through a single mode fiber optic guide 26 to the IOC 12. The detection circuitry, connected to the fiber optic guide 28, may include a known PIN-diode transimpedance amplifier detection system.

The source beam incident at the IOC is filtered by a single polarization filter 30 and a single mode filter 32 located in the IOC's "common path" waveguide section 33. This is the waveguide section which guides both the source incident beam to the sensing loop and the interference signal from the loop to the detection circuitry. The polarizing filter attenuates the undesired polarization mode. Ideally the extinction ratio (the ratio of the output power in the desired polarization mode divided by the output power in the undesired polarization mode) is as large as possible, e.g. in the range of 100 to 120 dB.

The polarization filters used in prior art FOGs typically comprise: bulk optic polarizers (such as a Glan-Thompson prism), optic fiber polarizers, or thin film polarizers on titanium diffused LiNbO$_3$ IOCs. The bulk polarizers have extinction ratios as high as 60 dB, but are difficult to interface with optical fibers and waveguides used elsewhere in the FOG. The other type prior polarizers typically have extinction ratios smaller than 60 dB. In the proton exchanged (PE) FOG IOC of the present invention, the polarizer comprises the entire PE waveguide array disposed on the IOC, which provides extinction ratios greater than 60 dB, and which interfaces easily with connecting optic fibers.

The polarized output beam from the filter 30 is presented to a single mode filter 32, which may comprise a segment of the single-mode waveguide system on the IOC. The mode filtering provided by the filter 32 may be supplemented by that of the single-mode guide 26.

The single-polarization, single-spatial-mode optical signal from the filter 32 is presented to a beam splitter/combiner 34, which may be a Y-junction or a 3 dB directional coupler, which divides the filtered source light equally into two beams which are directed to the respective sensing loop waveguide sections 35, 36. Guide section 35 couples the first beam through a dither modulator 37, and section 36 guides the second beam through a serrodyne modulator 38, into opposite ends 40, 42 of the fiber sensing coil 20. The beams propagate in opposite directions through the coil as first and second counter circulating beams, and are returned from the loop, through the opposite phase modulator, to the splitter/combiner 34. Upon recombination, the Sagnac differential phase produced by rotation of the loop, causes the counter circulating beams to produce an interference signal. The interference signal is then coupled back along the common path guide 33, through the mode filter and polarizer, to the detection circuitry 16, by way of output tap 18.

Each beam is modulated twice by each modulator during transit through the loop; upon entry and again upon exit. The dither modulator 37 provides phase modulation of each beam so as to cause the differential phase to dither. This dither improves measurement sensitivity by allowing for AC detection of the differential phase value. The dither is at a maximum when the modulation frequency is equal to the eigenfrequency of the fiber sensing coil.

The serrodyne modulator 38 applies a linear ramped phase modulation to each beam. If the peak ramp amplitude is $2\pi$ radians, and the flyback following each ramp segment is essentially instantaneous, the serrodyne modulation acting on oppositely directed beams at somewhat different times due to optical delay in the coil, produces an effectively constant bias to the differential phase. The bias can be controlled by a servo loop within the control circuitry 22 to continuously oppose the Sagnac phase difference, the nulling the phase difference, as is known in the prior art. The serrodyne ramp frequency then constitutes a gyro output proportional to the loop rotation rate.

In the present invention all of the FOG system elements, except the light source 14, the detector 16, the tap 18, and the sensing coil 20, are integrated on a single IOC substrate. Future embodiments may also add the tap 18 to the IOC. This offers a number of advantages. First, the IOC may be mass produced using technology similar to that used in semiconductor manufacture. This makes the FOG IOC less expensive than the discrete components it replaces. Second, with phase modulator (37,38) frequencies possibly extending to the gigahertz range, the large bandwidth capabilities of IO devices is advantageous. Most importantly, the high birefringence of proton exchanged waveguides, and their intrinsic ability to guide only one polarization, preserves input polarizations in the IOC. This occurs even for components such as beamsplitters which perform poorly in this respect when fabricated in fiber optic form.

Figure 1:
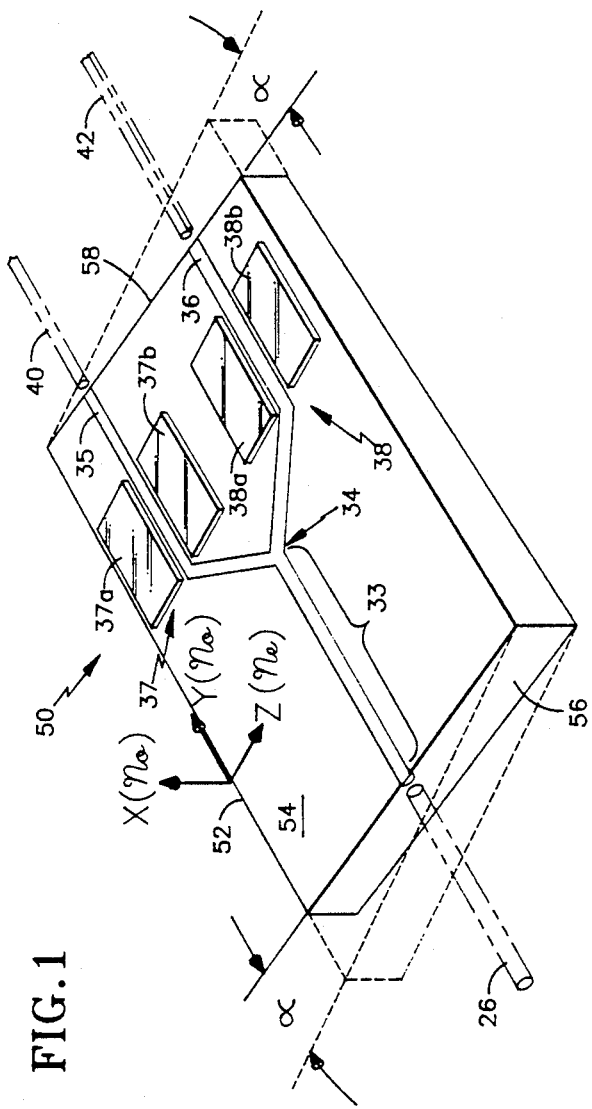
FIG. 1 is a perspective illustration of a FOG IOC embodiment according to the present invention.

FIG. 1 is a perspective illustration of an IOC 50 according to the present invention. To provide reference to the IOC schematic representation of FIG. 2, the IOC is shown with the same fiber guide connections (26 at the input end and 40, 42 at the sensing coil end) as in FIG. 2, The IOC includes a crystalline material substrate 52 having a major surface 54 for receiving the integrated optic elements. The substrate includes fiber optic mating ends 56, 58.

The substrate material is preferably X-cut crystal; either $LiNbO_3$ or $LiTaO_3$. Z-cut and Y-cut crystal (in that order) may also be used. The substrate of FIG. 1 is X-cut crystal with an extraordinary index of refraction along the Z axis.

The IO element disposed on the surface 54 include the waveguide array comprising the common path guide section 33, the Y-junction splitter 34, and loop waveguide sections 35, 36. As described in detail hereinafter, the waveguide array is fabricated by a proton exchange process. As a result the array, per se, is a single mode, single polarization system. There is no need for separate, i.e. discrete, spatial-mode and polarization filters (30, 32 in FIG. 2).

Further IO elements include the electrodes 37a, 37b for the dither modulator 37, and 38a, 38b for the serrodyne modulator 38. The paired electrodes are located symmetrically about the associated loop guide sections 35, 36.

The FOG IOC may be fabricated using the two step proton exchange (TSPE) process disclosed and claimed in a commonly owned, copending patent application filed on even data herewith by Suchoski et al, entitled: *Low-Loss Proton Exchanged Waveguides for Active Integrated Optic Devices*, U.S. patent application Ser. No. 329,123.

Fabrication begins with deposition of a masking layer of aluminum (Al) or chromium (Cr) on the substrate surface 54. The masking layer is patterned and etched to form the Y junction splitter 34, the common path guide section 33, and the loop guide sections 35, 36. The etched mask limits the proton exchange to the patterned area. The actual channel pattern widths depend on the selected signal wavelength, but range from 3 to 10 microns.

The crystal substrate is then immersed in a concentrated benzoic acid bath for two to sixty minutes. The acid bath is at a temperature of from 150° C. to 250° C. Following the bath, the crystal is annealed at an elevated temperature in the range of from 300° C. to 400° C., for a period of from one to five hours. The exact set of processing conditions are dependant on the selected substrate material (whether $LiNbO_3$ or $LiTaO_3$), the wavelength, crystal cut, and the modal dispersion requirements.

The metallization for the modulator paired electrodes 37a, 37b and 38a, 38b is deposited and patterned using photolithographic techniques and electrode materials well known in the art. Electrical connections (not shown) can be made to external electronic systems by wire bonding.

The TSPE process locally increases the extraordinary refractive index (within the waveguide channels) and locally decreases the ordinary refractive index. As a result, for the FIG. 1 FOG IOC with X-cut orientation, it is only possible to support a guide optical mode polarized along the Z axis (extraordinary axis).

Reflections at the two IOC interfaces with the sensing coil contribute to FOG offset errors. These reflections occur as a result of refractive index mismatch between the fiber guides (32, 34) and the IOC mating waveguide sections. They produce severe offset errors if the two IOC to fiber interferences are equidistant (within the light source coherence length) from the Y-junction splitter. The reflections may be minimized by angling the fiber mating ends 56, 58 of the IOC by an angle $\alpha$, where $\alpha > 8°$. As shown in FIG. 2, in the preferred embodiment all endfaces of the IOC are angled at a typical bias of $\alpha = 10°$.

As described hereinbefore, additional FOG system elements, such as the tap 18 (FIG. 2), can be incorporated on the IOC. Also, the present proton exchange IOC can be used in ringresonator FOG systems as well as the interferometric type described here.

Although the invention has been shown and described with respect to a best mode embodiment thereof, it should be understood by those skilled in the art that the foregoing and various other changes, omissions, and additions in the form and detail thereof, may be made therein without departing from the spirit and scope of this invention.

We claim:

1. A fiber optic gyro (FOG) system comprising:
   source means, for providing a source light beam;
   interferometric loop means, having optic fiber waveguides for counter circulating two light beams in phased displacement around a rotating loop, said phased displacement providing a differential phase magnitude proportional to the speed of rotation of said loop;
   integrated optic circuit (IOC) means, having a waveguide array disposed on a major surface of a refractive material substrate, said array including beam splitter/combiner means and including two loop guide sections, said beam splitter/combiner means splitting said source light beam into said two light beams for counter circulation through said loop guide sections and said interferometric loop, and for combining said phase displaced light beams from said loop into an interference signal embodying said differential phase magnitude, said IOC means further having modulator means disposed on said major surface in juxtaposition to said loop guide sections, for electrooptically modulating the phase of each of said two light beams;
   detector means, responsive to said interference signal for providing a signal manifestation of said differential phase magnitude; and
   means for coupling said source light beam to said IOC means and for coupling said interference signal from said IOC to said detector means;
   as characterized by:

said waveguide array being formed in said major surface by a two step proton exchange (TSPE) process comprising the steps of:

immersing said substrate, for a period of from two to sixty minutes, in a benzoic acid bath at a temperature of from 150° C. to 250° C.;

removing said substrate from said bath following said step of immersing; and annealing said substrate for a period of from one to five hours at a temperature of from 300° C. to 400° C.

2. The system of claim 1, wherein said IOC substrate material comprises $LiNbO_3$.

3. The system of claim 1, wherein said IOC substrate material comprises $LiTaO_3$.

4. The system of claim 2, wherein said substrate material further comprises X-cut crystal material.

5. The system of claim 3, wherein said substrate material further comprises X-cut crystal material.

6. The system of claim 2, wherein said substrate material further comprises Z-cut crystal material.

7. The system of claim 3, wherein said substrate material further comprises Z-cut crystal material.

8. The system of claim 2, wherein said substrate material further comprises Y-cut crystal material.

9. The system of claim 3, wherein said substrate material further comprises Y-cut crystal material.

10. The system of claim 1, wherein said beam splitter/combiner means comprises a symmetrical Y-junction.

11. The system of claim 1, wherein said beam splitter/combiner means comprises a directional coupler.

12. An integrated optic circuit (IOC), for use in a fiber optic gyro (FOG) having: a light source for providing a source light beam, an interferometric loop for counter circulating two light beams around a loop at a differential phase proportional to a rotational speed of the loop, detector circuitry for detecting the differential phase magnitude by sensing the magnitude of an interference signal resulting from combination of the counter circulating light beams, and signal coupling circuitry for presenting the source light beam from the light source to the IOC and for presenting the interference signal from the IOC to the detector circuitry; the IOC comprising:

a refractive material substrate having a major surface; and waveguide array means, connected to the signal coupling circuitry and including beam splitter/combiner means and including two loop guide sections, said beam splitter/combiner means splitting the source light beam into two light beams for counter circulation through said loop guide sections and the interferometric loop, and for combining the counter circulated light beams from the loop into an interference signal embodying the differential phase magnitude, said IOC means further having modulator means disposed on said major surface in juxtaposition to said loop guide sections, for electrooptically modulating the phase of each of said two light beams;

as characterized by:

said waveguide array means being formed in said major surface by a two step proton exchange (TSPE) process comprising the steps of:

immersing said substrate, for a period of from two to sixty minutes, in a benzoic acid bath at a temperature of from 150° C. to 250° C.;

removing said substrate from said bath following said step of immersing; and annealing said substrate for a period of from one to five hours at a temperature of from 300° C. to 400° C.

13. The system of claim 12, wherein said IOC substrate material comprises $LiNbO_3$.

14. The system of claim 12, wherein said IOC substrate material comprises $LiTaO_3$.

15. The system of claim 13, wherein said substrate material further comprises X-cut crystal material.

16. The system of claim 14, wherein said substrate material further comprises X-cut crystal material.

17. The system of claim 13, wherein said substrate material further comprises Z-cut crystal material.

18. The system of claim 14, wherein said substrate material further comprises Z-cut crystal material.

19. The system of claim 13, wherein said substrate material further comprises Y-cut crystal material.

20. The system of claim 14, wherein said substrate material further comprises Y-cut crystal material.

21. The system of claim 12, wherein said beam splitter/combiner means comprises a symmetrical Y-junction.

22. The system of claim 12, wherein said beam splitter/combiner means comprises a directional coupler.

* * * * *